United States Patent [19]

Burstain et al.

[11] Patent Number: 4,543,389

[45] Date of Patent: Sep. 24, 1985

[54] COPOLYMERIZATION CATALYST AND PROCESS FOR POLYMERIZING IMPACT RESISTANT ETHYLENE-PROPYLENE POLYMERS

[75] Inventors: Israel G. Burstain; Brian L. Goodall, both of Houston, Tex.

[73] Assignee: Shell Oil Company, Houston, Tex.

[21] Appl. No.: 598,619

[22] Filed: Apr. 10, 1984

[51] Int. Cl.$^4$ ............................................ C08F 297/08
[52] U.S. Cl. ...................................... 525/53; 525/247; 525/268; 525/323; 526/903; 526/904
[58] Field of Search .................. 526/903, 904; 525/53, 525/247

[56] References Cited

U.S. PATENT DOCUMENTS

| | | | |
|---|---|---|---|
| 3,200,173 | 8/1965 | Schilling | 260/878 |
| 3,318,976 | 5/1967 | Short | 260/878 |
| 3,514,501 | 5/1970 | Leibson et al. | 260/878 |
| 3,723,403 | 3/1973 | Greaves et al. | 526/903 |
| 4,284,738 | 8/1981 | Zukowski | 525/247 |
| 4,334,041 | 6/1982 | Zukowski | 525/53 |

*Primary Examiner*—Wilbert J. Briggs, Sr.
*Attorney, Agent, or Firm*—Dean F. Vance

[57] ABSTRACT

A process for the preparation of ethylene-propylene impact copolymers at improved catalyst productivity rates involving the formation of a propylene prepolymer by polymerization of propylene in liquid phase in the presence of a catalyst system containing titanium halide supported on magnesium halide and aluminum alkyl complexed with an electron donor. Ethylene and propylene are block polymerized onto the prepolymer in a vapor phase reaction zone in the presence of a second catalyst system comprising a solution of a $C_5$–$C_9$ polyalpha-monoolefin/catalyst/diluent.

13 Claims, No Drawings

COPOLYMERIZATION CATALYST AND PROCESS FOR POLYMERIZING IMPACT RESISTANT ETHYLENE-PROPYLENE POLYMERS

FIELD OF THE INVENTION

This invention relates to a catalyst and process for preparing impact-modified propylene polymrs. More particularly, the invention relates to a catalyst and process for making impact-improved, sequentially polymerized propylene-ethylene copolymers at high efficiencies and high yields.

BACKGROUND OF THE INVENTION

Polypropylene is a well known commercial polymer, used for a variety of products such as packaging films and extruded and molded shapes. It is produced by polymerization of propylene over transition metal coordination catalysts, specifically titanium halide containing catalysts. Commerical polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Multiple stage processes of this type are also known. Products of such sequential polymerization processes are sometimes referred to as "block copolymers" but it is now understood that such products may rather be intimate blends of polypropylene and ethylene-propylene elastomer. The products of such sequential polymerization of propylene and ethylene-propylene mixtures, are referred to herein as sequentially polymerized propylene-ethylene copolymers or as in-situ produced copolymers. To maintain separate terminology for the total sequentially polymerized copolymer composition and the elastomeric copolymer fraction thereof, the total copolymer composition is referred to as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, "Toughened Plastics" by C. B. Bucknall, Applied Science Publishers Ltd. 1977, pp. 87–90, and T. G. Heggs in Block Copolymers, D. C. Allport and W. H. James (eds), Applied Science Publishers Ltd. 1973, chapter 4. Representative U.S. patents describing such methods are: U.S. Pat. Nos. 3,200,173— Schilling; 3,318,976— Short; and 3,514,501— Leibson et al.

As disclosed in U.S. Pat. No. 3,514,501, a propylene polymer preblock is prepared, preferably in the liquid phase, by catalytic polymerization of propylene in a hydrocarbon diluent such as liquid propylene to form a slurry. After a separation of the slurry, the prepolymer which still contains active catalyst residues is introduced into at least one reaction zone, where it is reacted with monomer vapors for a sufficient period of time to form the polymer post block onto the polymer preblock in the desired proportions.

In the past, the conventional catalyst system used in such a polymerization process has been an unmodified or an electron donor-modified titanium halide component, activated with an organoaluminum cocatalyst. Typical examples of conventional propylene polymerization catalyst systems include cocrystallized titanium trichloride-aluminum trichloride catalysts of the general formula $n.TiCl_3AlCl_3$ activated with diethylaluminum chloride or triethyl aluminum. The cocrystallized titanium trichloride-aluminum trichloride may also be subjected to a modification treatment with a suitable electron donor compound to increase its activity or stereospecificity. Such compounds include phosphorus compounds, esters of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of alpha-olefins. These olefin polymerization catalysts are prepared by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalyst of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum tiralkyl such as aluminum triethyl or aluminum tri-isobutyl, often used at least partially complexed with selectivity control agent. The selectivity control agent typically is an aromatic ester such as ethyl-para-methoxy-benzoate (ethyl anisate) or methyl-p-toluate.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, provided that the polymerization reaction is carried out in a liquid diluent, e.g., liquid propylene monomer. However, in the vapor phase polymerization used in preparing the EP copolymer block of P-EP block copolymer described above, using conventional operating conditions, it has been found that the rapid catalyst deactivation left insufficient catalyst activity in the gas-phase copolymerization reactors.

One means to improve the activity in the copolymerization is disclosed in U.S. Pat. No. 4,284,738. In the '738 patent, vapor phase polymerization is conducted in the presence of further added quantities of aluminum trialkyl catalyst components amounting from about 5 to about 50% of the quantity used in the preparation of the propylene prepolymer. Increases in ethylene incorporation as well as in impact strength of the product are achieved by this process improvement. However, these are still some problems connected with the aforementioned process in that process control is somewhat difficult to maintain. For instance, heating and cooling requirements in the vapor phase reaction zone fluctuate considerably, and if not constantly monitored, can cause unwanted variations in polymerization temperature, productivity, and product quality. It sometimes results in a "sticky" polymer product with attending materials handling problems.

Another approach is disclosed in U.S. Pat. No. 4,334,041. In the '041 patent, additional quantities of supported titanium halide catalyst component are added to the vapor phase reaction zone and the alkyl aluminum catalyst compound added to the vapor phase reaction zone is at least partially complexed with an electron donor compound at a mole ratio of alkyl aluminum to electron donor within a very narrow range and different from that used in the prepolymer preparation. It is also important in the patent that the temperatures of each of the zones be controlled within rather narrow limits or the extent of the above described improvements will be less or even completely counteractive.

A new process has now been found that results in high yields of impact copolymers without the problems associated with the '738 and '041 processes, and which has the added benefit of reducing the formation of "gels".

SUMMARY OF THE INVENTION

The present invention relates to a process for making impact-improved, sequentially polymerized propylene-ethylene copolymers with a high activity catalyst. In particular, the present invention is an improvement in the process for preparing impact resistant ethylene-propylene polymers having high impact properties combined with high stiffness, which process comprises:

(a) preparing a propylene prepolymer by polymerizing propylene in a first liquid phase reaction zone in the presence of a first catalyst system comprising:
  (i) a highly active solid catalyst component comprising titanium tetrachloride, magnesium chloride, and an electron donor,
  (ii) as cocatalyst a compound $AlR_3$ where R represents an alkyl group of from 2 to 8 carbon atoms, and
  (iii) a selectivity control agent which may be partly or totally complexed with the catalyst;

(b) separating the propylene prepolymer from volatile constituents; and (c) introducing said separated propylene prepolymer, ethylene monomer and propylene monomer into at least one vapor phase reaction zone;

wherein the improvement comprises introducing a second catalyst system into said vapor phase reaction zone, said second catalyst system comprising the solution prepared by:

(i) polymerizing a $C_5$–$C_9$ alpha-monoolefin in a second liquid phase reaction zone in the presence of a second catalyst system selected from the group consisting of:
  (i) a $MgCl_2$ supported-type catalyst system comprising a highly active solid catalyst component comprising titanium tetrachloride, magnesium chloride, and an electron donor, as cocatalyst a compound $AlR_3$ where R represents an alkyl group of from 2 to 8 carbon atoms, and optionally a selectivity control agent which may be partly or totally complexed with the co-catalyst; and
  (ii) a Ziegler/Natta-type catalyst system comprising an active $TiCl_3$ catalyst component and an organoaluminum compound of the formula $AlR^1{}_nX_{3-n}$ where $R^1$ is an alkyl group of 2 to 12 carbon atoms, X is hydrogen or halogen and n has a value of from 0.1 to 3;

and a diluent, wherein said diluent is selected such that the resulting polymer is soluble therein and wherein the amount of $C_5$–$C_9$ alpha-monoolefin polymerized therein is about 0.05 to about 100 grams per gram of second catalyst system; and (ii) recovering the resultant catalyst-diluent-polymer mass.

As shown in the examples which follow, the process envisioned involves injecting a "solution" of prepolymerized procatalyst and cocatalyst into the gas phase copolymer reactor. This procatalyst solution will coat the homopolymer powder and the copolymer formed with the fresh catalyst will grow on the homopolymer powder particle, thus minimizing the formation of fine polymer particles. The two main advantages in the above approach are:

1. The use of very small procatalyst particles for production of the block copolymer should minimize the formation of "gels" which were shown to be formed with large, highly active catalyst particles. The copolymer formed should also be well dispersed.

2. It will introduce a fresh and highly active catalyst into the copolymer reactors. This is particularly important with the fast decaying $MgCl_2$-type catalyst.

DETAILED DESCRIPTION OF THE INVENTION

First Catalyst System and Propylene Homopolymerization

The procatalysts which are employed in the first catalyst system in this invention may be produced by methods known in the art. These procatalysts are any one of the recently developed, high activity magnesium halide supported catalyst components disclosed e.g., in U.S. Pat. Nos. 3,953,414, 4,051,313, 4,115,319, 4,149,990, 4,211,339, 4,220,554, 4,226,741, 4,263,169, 4,329,253, 4,400,302 and 4,414,132, hereby incorporated in this application by reference.

A preferred procatalyst may be prepared by reacting a magnesium alkoxide, suitably magnesium diethoxide, with titanium tetrachloride in the presence of or with subsequent addition of an aromatic ester electron donor, preferably in the presence of and/or with subsequent treatment with a halohydrocarbon liquid, to produce a composition of combined tetravalent titanium chloride compounds, magnesium chloride and the electron donor, and further treating the resulting solid at an elevated temperature with titanium tetrachloride in one or more contacts. These procatalysts have the general formula

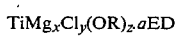

$$TiMg_xCl_y(OR)_z \cdot aED$$

wherein R is an alkyl group of 2-8 carbon atoms or an aryl, alkaryl, or aralkyl group of 6 to 20 carbon atoms, preferably ethyl; ED is an electron donor, preferably an aromatic ester;

x=5-40 and preferably 9-20;
y=10-100 and preferably 20-40;
z=0.02-1.0 and preferably 0.05-0.5; and
a=0.5-10 and preferably 0.6-3.5.

A variety of electron donor compounds, disclosed in the prior art as useful in the preparation of supported coordination procatalysts may be employed as compound ED. Esters are preferred; aromatic esters are most preferred. Very good procatalysts can be made using ethyl benzoate, p-ethyl toluate or ethyl-p-methoxybenzoate as compound ED.

Cocatalysts used as component (b) with procatalysts treated according to this invention are trialkyl aluminum compounds $AlR'_3$ wherein R' is an alkyl group of 2 to 8 carbon atoms, preferably ethyl. They may be complexed in whole or in part with a selectivity control agent.

A variety of electron donor compounds, disclosed in the prior art for use as selectivity control agents, may be employed as catalyst component (c). Preferred are esters of aromatic carboxylic acids, which may be complexed in whole or in part with the cocatalyst. Preferred selectivity control agents are ethyl-p-methoxybenzoate and ethyl-p-ethoxybenzoate. Examples of other preferred esters suitable as selectivity control agents are methyl- and ethylbenzoate, methyl-p-methoxybenzoate and methyl- and ethyl-p-toluate.

Polymerization of propylene in the first step is conducted in a liquid system with an inert diluent such as a paraffinic liquid of 3 to 15 carbon atoms per molecule, or in a liquid system containing propylene as sole diluent or together with a small amount of propane. Propylene polymerization in liquid phase is conducted at temperatures of 50° to 80° C. and at a pressure sufficient to maintain liquid conditions.

If desired, the propylene polymerization in the first stage may include a minor amount (e.g. 0.1 to 10 weight percent, preferably 1 to 6 weight percent) of a comonomer (e.g. ethylene), resulting in a random copolymer being produced in the first stage.

In a continuous reaction system, the liquid in the reaction zone is maintained at reaction conditions, monomer is continuously charged to the reaction zone, catalyst components are also charged continuously or at frequent intervals to the reaction zone, and reaction mixture which contains polymer is withdrawn from the reaction zone continuously or at frequent intervals; polymer product is recovered from the withdrawn reaction mixture.

In propylene polymerization, the reaction mixture is typically maintained at conditions at which the polymer is produced as a slurry of powder in the reaction mixture. The catalyst systems of this invention are extremely active and highly stereoselective in propylene polymerization, so that no removal of catalyst components or of atactic polymer from the polymer product is required.

While the catalysts of this invention are particularly adapted for use in continuous polymerization systems, they may, of course, also be employed in batch polymerization. This may be of advantage in multistage polymerization, in which propylene polymers and propylene-ethylene polymers are produced in separate reaction zones arranged in sequence.

In batch reactions, it is generally preferred to first introduce monomer and then cocatalyst and selectivity control agent into the reaction zone and then add the procatalyst last.

The total amount of aluminum alkyl compounds in the first polymerization reaction mixture is generally in the range from about 10 to about 200 moles per atom of titanium in the procatalyst and in most cases preferably between about 30 and 130.

Differently prepared procatalysts vary in the Al:Ti ratio required for best results, as will be known to persons familiar with this type of catalyst. In general, activity is greater at higher Al:Ti ratios, but this results in higher aluminum residues of the undeashed polymer, which is undesirable; it also tends to increase the requirement of selectivity control agent in order to maintain the desired degree of isotacticity of the product, and the selectivity control agent generally also has the effect of reducing catalyst activity. The desired balance of concentration of catalyst components is readily determined by experiment.

The molar ratio of aluminum to selectivity control agent is suitably in the range from 0.5:1 to 25:1, preferably from 0.75:1 to 4:1.

It is well known that supported coordination procatalysts and catalyst sytems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and freed of potential catalyst poisons.

The monomer feed to Ti metal weight ratio in the first stage liquid phase polymerization is usually about 2 to 3 kg propylene per mg Ti for batch operation or between 1 to 2 kg propylene per mg Ti for continuous operation.

The prepolymer from the reaction zone is taken to a separation zone, such as a cyclone or a bag filter, wherein the volatile constituents are separated from the polymer and processed according to known techniques and recycled to the reaction zone, the amount of volatiles removed being sufficient so that less than 10% and preferably no more than 5% volatile content remains in the prepolymer.

Second Catalyst System and Propylene/Ethylene Copolymerization

The essence of the present invention deals with the injection of a second catalyst system in solution into the vapor phase reaction zone. The catalyst (prior to solubilizing) may be a particular $MgCl_2$ supported-type catalyst system or a particular Ziegler/Natta-type catalyst system.

Regarding the $MgCl_2$ supported-type catalyst, the procatalyst and co-catalyst portions are as defined for the First Catalyst System. Since catalyst stereoselectivity is not an important factor in copolymer production, it is not essential that a separate selectivity control agent be employed. In fact, in some circumstances it may be undesirable to employ a selectivity control agent in the Second Catalyst System. It is desirable that the procatalyst and cocatalyst be the same for the First Catalyst System and the Second Catalyst System. In this way, one need only prepare and store one type procatalyst and cocatalyst.

The Ziegler/Natta-type catalyst comprises an active $TiCl_3$ catalyst component and an organo-aluminum component. It is well known that titanium tetrachloride ($TiCl_4$) can be reduced with an organo-aluminum derivative to give beta-$TiCl_3$. This form of $TiCl_3$ is generally known to be unsuitable for the stereo-specific polymerization of alpha-olefins to give desirable high yields of polymers having an adequate, high isotacticity. Beta-$TiCl_3$ is therefore converted to a more active form, usually delta- or gamma-$TiCl_3$, by means of a heat treatment at a temperature up to 250° C., for example, 150° to 200° C. It is desirable to maintain the elevated temperature conditions for a sufficient period of time to ensure adequate conversion to the active form. Such active $TiCl_3$ may also be prepared directly by reducing $TiCl_4$ with an alkyl aluminum compound at an elevated temperature, for example, 150° to 200° C., e.g., using certain ethers as the reaction medium. See, for example, U.S. Pat. No. 4,259,466.

The organo-aluminum compound is preferably an aluminum alkyl derivative of empirical formula:

$$AlR^1{}_nX_{3-n}$$

in which $R^1$ is an alkyl group of 2 to 12, preferably 2 to 6 carbon atoms, for example ethyl; X is a hydrogen atom or halogen, preferably chlorine, atom; and n has a value from 0.1 to 3, preferably from 1.5 to 3. Particularly preferred aluminum alkyl derivatives are triethylaluminum and diethylaluminum chloride.

The molar ratio of the aluminum compound to $TiCl_3$ may be from 0.5:1 to 10:1, preferably from 2:1 to 5:1.

Whether one uses a $MgCl_2$ supported-type catalyst or a Ziegler/Natta-type catalyst, the particular catalyst is used to polymerize a $C_5$–$C_9$ alpha-monoolefin in a second liquid phase reaction zone. Preferred alpha-monoolefins are pentene-1, hexene-1 and heptene-1, with pentene-1 being preferred. A key aspect of the present invention is that the liquid phase polymerization take place in the presence of a particular diluent, selected such that the resulting polymer is soluble therein. Whether a polymer is soluble or not can be readily determined by one skilled in the art by appearance of the solution. The term soluble as used herein means soluble at about 15° C. to about 40° C. Diluent choices include aliphatic, cycloaliphatic or aromatic hydrocarbons having a carbon number greater than or equal to six (6), in particular isooctane, toluene and xylene. The following Table A lists appropriate solvent choices for the particular alpha-monoolefins:

TABLE A

| $C_5$–$C_9$ Alpha-monoolefin | Diluent |
| --- | --- |
| pentene-1 | isooctane, toluene |
| hexene-1 | isooctane, toluene |
| vinylcyclohexane | isooctane, cyclohexane, xylene |
| 4-methylpentene-1 | toluene |

The prepolymerization is carried out at temperatures between 0° C. and 70° C., preferably between 20° C. and 40° C. The prepolymerization can be executed batchwise or continuously (when feeding a continuous polymerization reactor). The cocatalyst to catalyst molar ratio will be the same or lower than that in the main polymerization reactor.

The polymerization is most conveniently executed in the *absence* of a selectivity control agent, but a selectivity control agent (electron donor) can optionally be applied if required. The amount of solvent required is determined by criteria such as the viscosity of the resulting solution but primarily by the solubility of the prepolymer product. Hence the amount of solvent required can be readily determined by experiment, and will obviously increase as the amount of $C_5$–$C_9$ alpha-monoolefin polymerized per gm catalyst increases.

Since the ultimate product desired is an ethylene/propylene impact polymer it is desired to keep the amount of $C_5$–$C_9$ alpha-monoolefin content to a minimum. Accordingly, the amount of $C_5$–$C_9$ alpha-monoolefin polymerized therein should be about 0.05 to about 100 grams per gram of Second Catalyst System, preferably about 3 to about 75 grams olefin per gram catalyst.

The resulting catalyst-diluent-polymer mass is in the form of a solution or a colloidal dispersion and is recovered for injection into the vapor phase reaction zone.

In the vapor phase block polymerization, the polymer recovered from the separation zone and containing active catalyst residues, is taken to a vapor phase reaction zone having provisions for introducing the second catalyst system, ethylene monomer and propylene monomer at one or more points in the zone (and inert gasses such as nitrogen) so that the active catalyst residues in the prepolymer and the added catalyst components cause said monomers to polymerize to a block thereby modifying the ultimate properties of the resin produced. The polymerization in the vapor phase reaction zone is typically carried out at pressures lower than those used for the prepolymer preparation, i.e., pressures of about 10 to about 300 psig. Polymerization temperatures should range from about 40° C. to about 100° C., and preferably from about 50° C. to about 80° C.

The ethylene and propylene monomers do not require premixing prior to introduction into the vapor phase zone; in fact, it is sometimes more advantageous to separately introduce each of the monomers at one or more points along the reaction length.

The molar ratio of ethylene to propylene monomer introduced to the vapor phase reaction zone is typically about 0.5:1 to about 2:1, preferably about 0.75:1 to about 1.25:1.

The amount of second catalyst system added to the vapor phase reaction zone should be between 10% and 100% of the first catalyst charge. Preferred amounts are between 20% and 80% but this will vary significantly depending on copolymerization conditions. The amount required to generate the desired level of rubber (10–30% Fc) can be readily determined by experiment.

Generally from about 10 to about 30 percent by weight of block based on the weight of the total polymer is produced in the total block polymerization reactor system.

The vapor phase reaction zone may be a continuously agitated reaction zone such as that disclosed in U.S. Pat. No. 3,514,501, a fluidized bed reaction zone, such as that disclosed in U.S. Pat. No. 4,379,759, or one or more pipe line reactors in series with optional jacketing for heat removal and suitable monomer introduction points as well as agitating means.

The second catalyst system is typically injected into the vapor phase reaction zone by means of a nozzle or nozzles such that it becomes evenly deposited on the homopolymer powder.

The following examples illustrate the invention.

EXAMPLES

The Procatalysts

In the following examples, the procatalysts were compositions of tetravalent titanium, magnesium, chlorine, and ethyl benzoate. The procatalyst solids were highly active and selective procatalysts in propylene polymerization.

Polymerization Procedure

Two one gallon stainless steel reactors were connected in series. The first (homopolymerization) reactor was filled with liquid propylene (2.7 liter) and small amounts of hydrogen prior to injecting the various catalyst components (see below) at 150° F. After the desired homopolymerization period the resulting slurry was pumped through a ball-valve into the second (copolymerization) reactor which was maintained at low pressure to facilitate evaporation of the liquid propylene, leaving a dry-bed of polypropylene powder. The copolymerization was run at low pressure (20–35 psig), 130°–175° F. and with a gas flow sufficient to maintain ~50% mol propylene, ~45% mol ethylene plus some hydrogen and propane in the reactor. In the example runs additional catalyst components were added to the second reactor immediately prior to commencing the copolymerization reaction, according to the presently claimed invention. These additional catalyst components were prepared by the liquid phase polymerization of 1-pentene in a suitable diluent (e.g. isooctane) in the presence of the above-described procatalyst and a triethyl aluminum cocatalyst.

EXAMPLE 1

A. Homopolymerization charge

The catalyst system for the homopolymerization comprised

| i. paraethylanisate | 0.58 mmol |
| ii. TEA | 0.90 mmol |
| iii. procatalyst | 0.015 mat Ti |
| DEAC | 0.21 mmol |

The polymerization of propylene was conducted for 25 minutes at 150° F.

B. Copolymerization charge

The "solubilized catalyst" was prepared at ambient temperature according to the present invention with the following components:

| i. TEA | 2.2 mmol | in 30 ml isooctane |
| ii. procatalyst | 0.012 mat Ti | |
| iii. 1-pentene | 1.5 ml | |

The copolymerization with ethylene and propylene was conducted at 20 psig for 60 minutes at 175° F.

| 291 g polymer | $e_T$ 10.5% w |
| | $f_c$ 16.24% w |
| | $e_c$ 64.7% w |

$e_T$ = ethylene content of total polymer
$f_c$ = fraction of ethylene-propylene rubber
$e_c$ = ethylene content of rubber fraction
TEA = triethyl aluminum
DEAC = diethyl aluminum chloride
mmol = millimoles
mat = milliatoms

EXAMPLE 2

Example 2 was conducted in a similar manner to Example 1 with some changes in amounts and conditions as noted below.

A. Homopolymerization charge

| i. paraethylanisate | 0.28 mmol |
| ii. TEA | 0.89 mmol |
| iii. procatalyst | 0.015 mat Ti |

Homopolymerization of propylene conducted for 30 minutes at 150° F.

B. Copolymerization of ethylene and propylene in the presence of "solubilized catalyst" having the following components:

| i. TEA | 2.2 mmol | in 30 ml isooctane |
| ii. catalyst | 0.012 mat Ti | at ambient temperature |
| iii. 1-pentene | 1.5 ml | |

Copolymerization conducted at 20 psig for 60 min at 175° F.

C. Result

| 370 g polymer | $e_T$ 15.41% w |
| | $f_c$ 26.13% w |
| | $e_c$ 60.5% w |

EXAMPLE 3

Example 2 was repeated except the homopolymer was run for 40 minutes and the copolymerization was run for 70 minutes.

Result

| 494 g polymer | $e_T$ 24.0% |
| --- | --- |
|  | $f_c$ 31.5% |
|  | $e_c$ 76.3% |

EXAMPLE 4

Example 2 was repeated except that in the copolymerization stage ("solubilized catalyst") paraethylanisate (0.20 mmol) was added immediately prior to the TEA and other catalyst components.

Result

| 450 g polymer | $e_T$ 18.04% w |
| --- | --- |
|  | $f_c$ 27.0% w |
|  | $e_c$ 66.71% w |

COMPARATIVE EXAMPLE 1

In Comparative Example 1, no "solubilized catalyst" components were added to the copolymerization step.

A. Homopolymerization charge

| i. paraethylanisate | 0.71 mmol |
| --- | --- |
| ii. TEA | 1.07 mmol |
| iii. procatalyst | 0.015 mat Ti |
| DEAC | 0.30 mmol |

30 min at 150° F.

B. Copolymerization

NO catalyst components added. 35 psig, 60 min 130° F.

C. Result 246 g polymer.
NO ethylene incorporation.

COMPARATIVE EXAMPLE 2

Comparative Example 2 was run in a similar manner to Comparative Example 1 with some changes in amounts and conditions as noted below.

A. Homopolymerization Charge

| i. paraethylanisate | 0.28 mmol |
| --- | --- |
| ii. TEA | 0.89 mmol |
| iii. catalyst | 0.015 mat Ti |

15 minutes at 150° F.

B. Copolymerization

NO catalyst components added.
35 psig, 70 min 150° F.

C. Result

| 220 g polymer | only 1.09% $e_T$ |
| --- | --- |

| $e_c$ 6.76% |
| --- |
| $f_c$ 16.12% |

Negligeable ethylene incorporation and unacceptable ethylene content in rubber (6.75% compared with the desired 60% $e_c$).

What is claimed is:

1. In the process for preparing impact resistant ethylene-propylene polymers having high impact properties combined with high stiffness, which process comprises:
   (a) preparing a propylene prepolymer by polymerizing propylene in a first liquid phase reaction zone in the presence of a first catalyst system comprising:
      (i) a highly active solid catalyst component comprising titanium tetrachloride, magnesium chloride, and an electron donor,
      (ii) as cocatalyst a compound $AlR_3$ where R represents an alkyl group of from 2 to 8 carbon atoms, and
      (iii) a selectivity control agent which may be partly or totally complexed with the co-catalyst;
   (b) separating the propylene prepolymer from volatile constituents; and
   (c) introducing said separated propylene prepolymer, ethylene monomer and propylene monomer into at least one vapor phase reaction zone;
   the improvement wherein a second catalyst system is introduced into said vapor phase reaction zone, said second catalyst system comprising the solution prepared by:
      (i) polymerizing a $C_5$–$C_9$ alpha-monoolefin in a second liquid phase reaction zone in the presence of a second catalyst system selected from the group consisting of:
         (i) a $MgCl_2$ supported-type catalyst system comprising a highly active solid catalyst component comprising titanium tetrachloride, magnesium chloride, and an electron donor, and as cocatalyst a compound $AlR^1_3$ where $R^1$ represents an alkyl group of from 2 to 8 carbon atoms; and
         (ii) a Ziegler/Natta-type catalyst system comprising an active $TiCl_3$ catalyst component and an organo-aluminum compound of the formula $AlR^2_n X_{3-n}$ where $R^2$ is an alkyl group of 2 to 12 carbon atoms, X is hydrogen or halogen and n has a value of from 0.1 to 3;
      and a diluent, wherein said diluent is selected such that the resulting polymer is soluble therein and wherein the amount of $C_5$–$C_9$ alpha-monoolefin polymerized therein is about 0.05 to about 100 grams per gram of second catalyst system; and
      (ii) recovering the resultant catalyst-diluent-polymer mass.

2. The process of claim 1 wherein said cocatalyst is triethyl aluminum.

3. The process of claim 1 wherein said electron donor is an aromatic ester.

4. The process of claim 3 wherein said electron donor is selected from the group consisting of ethyl benzoate, p-ethyl toluate and ethyl-p-methoxybenzoate.

5. The process of claim 1 wherein said solid catalyst component has the general formula

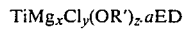

$TiMg_xCl_y(OR')_z \cdot aED$ wherein R' is an alkyl group of 2–8 carbon atoms or an aryl, alkaryl, or aralkyl group of 6 to 20 carbon atoms, ED is an aromatic ester;

$x = 5$–$40$;
$y = 10$–$100$;
$z = 0.02$–$1.0$; and
$a = 0.5$–$10$.

6. The process of claim 1 wherein said diluent employed in said second catalyst system is an aliphatic, cycloaliphatic or aromatic hydrocarbon with a carbon number $\geq 6$.

7. The process of claim 1 wherein said $C_5$–$C_9$ alpha-monoolefin is pentene-1 and said diluent is isooctane.

8. The process of claim 1 wherein propylene and ethylene are copolymerized in said first liquid phase reaction zone.

9. The process of claim 8 wheren said propylene prepolymer comprises about 90 to about 99 weight percent propylene and about 10 to about 1 weight percent ethylene.

10. The process of claim 1 wherein said second catalyst system is a $MgCl_2$ supported-type catalyst system.

11. The process of claim 10 wherein said $MgCl_2$ supported-type catalyst system also contains a selectivity control agent which may be partly or totally complexed with the co-catalyst.

12. The process of claim 11 wherein said $C_5$–$C_9$ alpha-monoolefin is pentene-1, said diluent is isooctane, and said co-catalyst used in said first and said second catalyst systems is triethyl aluminum.

13. The process of claim 1 wherein the molar ratio of ethylene to propylene monomer introduced to the vapor phase reaction zone is about 0.5:1 to about 2:1.

* * * * *